Sept. 14, 1965     R. LE ROY KEEFE, JR     3,205,931
PNEUMATIC TIRE
Filed Aug. 22, 1963
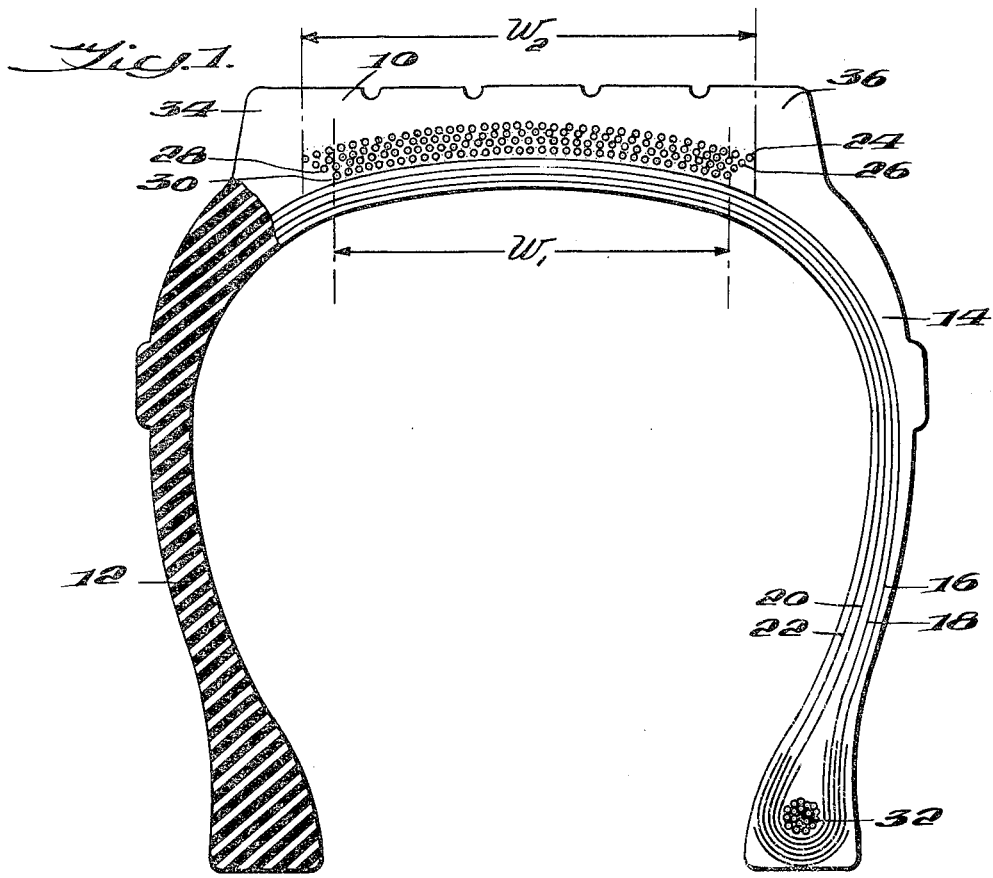
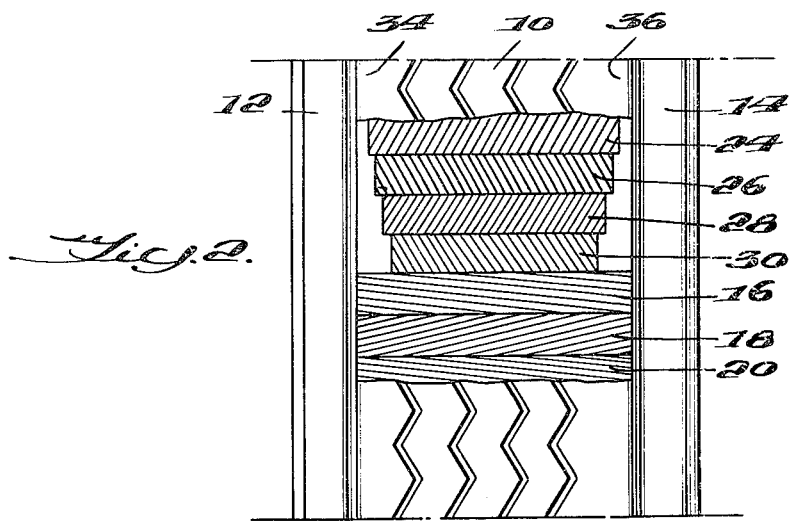

United States Patent Office 3,205,931
Patented Sept. 14, 1965

3,205,931
PNEUMATIC TIRE
Robert Le Roy Keefe, Jr., Chadds Ford, Pa., assignor to E. I. du Pont de Nemours and Company, Wilmington, Del., a corporation of Delaware
Filed Aug. 22, 1963, Ser. No. 303,856
4 Claims. (Cl. 152—354)

This invention relates to pneumatic tires and, more particularly, to a truck tire construction reinforced with a novel belt containing synthetic textile cords.

For the sake of prolonging the useful tread life of a tire, it has become a conventional practice to insert in the tire structure a reinforcement belt located between the carcass and the tread. The carcass for such a tire is reinforced with plies of rubber-embedded parallel cords crossing over the tire crown from bead to bead in directions nearly parallel to radial planes, i.e., planes which include the tire's axis of rotation. The reinforcement belt is comprised of parallel cords embedded in elastomer stock and located in planes that make a small angle with the equatorial plane, i.e., the plane (perpendicular to the tire's axis of rotation) which divides the tire into equal halves. Such belts, when they comprise steel cords, do indeed prolong the serviceable life of the tire tread compared to the tread life of a bias-carcass tire (which contains no belt) primarily because of the rigidity of the belt. However, such rigid structures give a harsh ride and lead to an unusually large number of failures in the shoulder area. A harsh ride is experienced when the vehicle rides over an uneven surface such as gravel, macadam, or asphalt with protruding small ends of crushed rock. Such an unsmooth surface sets up in the vehicle vibrations of high frequency and low amplitude, which vibrations loosen bolts and other connectors in the vehicle. Furthermore, because of the inextensibility and the kinking propensity of steel wire cords, recapping of steel-cord belted tires is extremely difficult.

Belted tires of textile cords have been described e.g., by Luigi et al. in U.S. Patent No. 2,982,328 and by Wenden in French Patent No. 1,145,600. However, these tires have not been found satisfactory in large truck tire sizes (9.00 x 20 and larger) because the relatively low fiber strength and the relatively low modulus of textile cords necessitate excessively thick belts which are not acceptable due to high heat build-up and consequent early tire failure.

The most important object of this invention is to provide a belt pneumatic tire construction which is not only suitable for use in the large truck tire sizes but also gives a long service life as well as smooth and comfortable riding characteristics.

Another important object of this invention is the provision of a belted pneumatic tire, in the large tuck tire sizes which is reinforced with textile cords but nevertheless operates at acceptably low temperatures.

Another object of this invention is the provision of a belted tire, in the large truck tire sizes, that is easily recapped.

These and other objects are accomplished with a pneumatic tire reinforced with carcass plies and a circumferential belt situated exteriorly of the outer carcass ply. The belt is made up of superimposed plies generally increasing in width from a relatively narrow inner ply to a widest outer ply. Each belt ply is comprised of a parallelized plurality of high modulus synthetic cords embedded in a high modulus skim stock.

A preferred embodiment is described herein with reference to the accompanying drawing wherein:

FIGURE 1 is a partially sectional and partially schematic illustration of a tire reinforced according to the present invention; and FIG. 2 is a fragmentary peripheral view of the tire shown in FIG. 1, portions of the tread having been removed to reveal (schematically) the manner in which cords of various plies are placed.

As shown in FIG. 1, the tire has a tread portion 10, side walls 12, 14, carcass plies 16, 18, 20, 22, belt plies 24, 26, 28, 30 and wire beads 32. Tread portion 10 has shoulder areas 34, 36.

Where belt cords are described as lying substantially parallel to the equatorial plane and carcass cords as lying essentially in radial planes, it will be understood, of course, that deviations within the limits normally practiced in the art are permissible also in this invention. Thus, the radial cords of carcass plies 16–22 (although parallel to each other throughout a given ply) may lie within any convenient angle not less than 70° with respect to the equatorial plane of the tire. In other words, they may make any angle between 0° and 20° with radial planes. Radial cords in a carcass with paired plies are divergent or opposite in direction to the radial cords in adjacent carcass plies.

The cords in a belt ply may lie at any angle not greater than 35° and not less than 10°, preferably between 15° and 25°, with respect to the equatorial plane, the acute angles made by the cords in adjacent plies with respect to the equatorial plane being nearly equal but opposite. That is, the cords in two adjacent plies are divergent with respect to each other and together cast out any lateral stress component due to their angular disposition.

As illustrated, the belt plies successively increase in width from the narrow inner ply 30 to the widest outer ply 24. In FIG. 1, the width of inner belt ply 30 has been designated $w_1$ and the width of outer ply 24 as $w_2$. Required width relationships are expressed by the equation $w_2 = k(w_1)$ with $k$ being in the range of from 1.02–1.10. By using belt plies of different widths, with $w_1$ smaller than $w_2$, and arranging them as illustrated, tires wear away less in the shoulder areas 34, 36 than do conventionally belted tires in which $w_2$ is smaller than $w_1$.

Pneumatic tires 9.00 x 20 and larger in size are ones that have a maximum load-carrying capacity of not less than 3040 pounds per tire when inflated to a pressure not less than 45 pounds per square inch, all as recommended in the Tire and Rim Association (2001 First National Tower, Akron 8, Ohio) 1961 Yearbook. For each tire size, the Tire and Rim Association recommends a range of load-bearing capacities and a range of inflation pressures. As the load increases, the recommended inflation pressure increases. For the purpose of this invention, the dipped synthetic cords for reinforcing such tires should have an initial modulus not less than 80 grams per denier and a tenacity not less than 6 grams per denier. When reinforced as disclosed herein, the belt has a thinness parameter not greater than about 0.13 and not less than 0.05, this parameter being numerically equal to the quotient:

Belt thickness in mils
———————————————————————————
Tire diameter (in.) at center of belt × recommended inflation pressure (p.s.i.)

The belt cords are embedded in skim stock with a modulus at 300% elongation of not less than 220 pounds per square inch, a modulus at 100% elongation of not less than 425 p.s.i. (both moduli as per ASTM Test D-412-51T), a Shore A hardness (ASTM Test D-676-49T) of not less than 65, and Yerzley resiliency (ASTM Test D-945-52T) of not more than 75%.

A textile-belted radial-carcass tire with a belt thinness parameter greater than 0.13 rides harsh and generates such a large amount of heat that the tire life is greatly shortened due to ply separation or blow-out. Because it would be obvious to achieve a stronger structural member by having it be thicker, the successful determination of a critical upper limit for thinness parameter to achieve an acceptably strong pneumatic tire is, in contrast, unexpected and quite unobvious.

Although high tenacity rayon, polyamides, and polyesters are all conventionally used to reinforce bias-carcass pneumatic tires, it is surprising and unexpected that only poly-ester cords with the above-specified critical values of tenacity and initial modulus are suitable for the belted tire of this invention.

Manufacture of a belted tire according to this invention may follow procedures which are common in the art. See for example U.S. Patent No. 2,814,331 (M. Vanzo et al.) and British Specification No. 922,463 (Dunlop Rubber Co.). In building the pneumatic tire of this invention, it is desirable that the green belt, when placed on the green tire carcass, be of such a circumferential dimension that either expansion or contraction of said belt in the curing operation is limited to the range of from 0 to about 0.5% of the circumference of the green belt.

EXAMPLE

A 10.00 x 20 truck tire with a load-bearing capacity of 4580 pounds per tire at an inflation pressure of 75 p.s.i. and with a medium-low-profile (section height/section width=0.85) is built according to the following procedures. On a rotatable, expansible drum is formed a cylindrical carcass comprising four plies, each ply containing parallel 840/1/2 cords of polyethylene terephthalate twisted 12 turns per inch in the ply and 12 turns per inch in the cord, 32 ends per inch, which cords are embedded in conventional elastomer skim stock and disposed in the radial planes of the drum. The wire beads for the tire are located at each end of the cylinder and the ply ends are turned around the beads and stitched. Elastomeric sidewall elements are placed on the carcass near each bead and stitched thereto with stitching rollers. Next, the drum is expanded so that the mid-line at the crown of the carcass (equatorial plane) has a circumference of 114 inches. Then a 325-mil thick belt, with a thinness parameter of 0.118, comprising 4 plies is centered on this circumference. Dimensions $w_1$ and $w_2$ are 8 and 8.5 inches, respectively, giving a $k$ of 1.06. Each belt ply contains parallelized 1680/7/2 cords of polyethylene terephthalate twisted 2.9 turns per inch in the ply and 2.8 turns per inch in the cord, 10 ends per inch for a total of 5.9 pounds of textile cords in the belt. These belt cords have an initial modulus of 100 g.p.d. and a tenacity of 7½ g.p.d. The belt cords, disposed at an angle of 18° with the equatorial plane of the tire (and divergent to the cords in the adjacent belt ply) are encased in an elastomer stock of the composition specified in the following table.

*Table I*

(Skim stock with 300% modulus of 2450 p.s.i., a 100% modulus of 450 p.s.i., a Shore A hardness of 67, and a Yerzley resiliency of 65%)

| | Parts by weight |
|---|---|
| Natural rubber | 100 |
| High abrasion furnace black | 60 |
| Stearic acid | 2 |
| Zinc oxide | 5 |
| Phenyl-alpha-naphthylamine (antioxidant) | 1 |
| N-cyclohexyl-2-benzothiazole sulfenamide (accelerator) | 0.5 |
| Light processing oil | 4 |
| Sulfur | 2.5 |

On top of this belt is centered a tread element of conventional elastomer material. The tread, belt, and carcass are stitched together with conventional stitching rollers. The 10.00 x 20 truck tire is cured in a mold with a maximum mold-section width of 10.8 inches and a mold-section height of 9.2 inches.

To construct a 10.00 x 20 belted tire of equal strength but with belt cords of high tenacity rayon (initial modulus of 85 g.p.d. and tenacity of 4.0 g.p.d.), eight plies are required in the belt. This rayon belt, with eleven pounds of textile material, is 670 mils thick and has a thinness parameter of 0.243. It should be noted that, for a rayon belt, about twice as much textile material is required as is required for a polyester belt, although the initial moduli are approximately similar. As indicated above, any textile belt with a thinness parameter as high as 0.243 generates so much heat that, if tire failure does not occur due to ply separation, failure occurs grom blow-out due to the heat-weakened cords. Size 10.00 x 20 belted tires with belt cords of polyhexamethylene adipamide (initial modulus of 35 g.p.d. and tenacity of 8.5 g.p.d.), constructed as are either the tire with rayon belt cords or the tire with polyester cords, do not wear satisfactorily.

When comparison is made with control passenger tires, some benefit for passenger size tires is had with the novel construction for the belt of this invention, i.e., with a belt having superimposed plies which generally increase in width from a relatively narrow inner ply to a widest outer ply. Surprisingly, there is a noticeably greater improvement in the wear of a truck tire constructed according to this invention.

Tread wear with polyester belted tires of the type disclosed herein is substantially equal to tread wear with wire belted tires and considerably better than with nylon belted tires. The high impact resistance of polyester fiber together with freedom from kink and rust problems provide a margin of superiority over wire in resistance to impact and high distortion, and in effects from cuts or nail puncture. The use of wire in belt plies presents a serious recapping problem due to its kinking and inexpansibility. Wire belts must also be built to much greater precision than belts of polyester, because of wire's high stiffness. Furthermore, wire belts must be built under much drier conditions to prevent rusting. Because of its higher strength per unit weight, high tenacity polyester fiber allows lighter belts than either wire (by 60% or more) or rayon (by 40% or more). This results in a much thinner belt of polyesters than of rayon which, therefore, decreases heat buildup problems in the tire, improves fiber property utilization (because of lower differential deflection between the inside and outside of the belt during rolling of the tire) and, in addition, provides better fatigue resistance. Polyester does not rot as does rayon; and its strength is not reduced by moisture as is rayon strength.

It is apparent that many changes and modifications may be made in the disclosed belted-tire construction as well as in the exemplified procedures without departing from the spirit of the present invention, which, therefore, is intended to be limited only by the scope of the appended claims.

Having thus described the invention, what is claimed as new and desired to be secured by Letters Patent is:

1. A pneumatic tire including a tread portion, said tire being reinforced with carcass plies and a circumferential belt situated exteriorly of the carcass plies, said belt comprising superimposed plies generally increasing in width from a relatively narrow inner ply to a widest outer ply, the latter ply having a width less than that of the tread portion, each belt ply comprising a parallelized plurality of high modulus polyester cords embedded in a high modulus skim stock and lying substantially parallel to the equatorial plane of the tire, each carcass ply comprising a parallelized plurality of synthetic cords lying substantially in radial planes of the tire.

2. The tire of claim 1 wherein said belt has a thinness parameter of from 0.05–0.13.

3. The tire of claim 2 wherein said polyester belt cords have an initial modulus of at least 80 grams/denier and a tenacity of at least 6 grams/denier.

4. A pneumatic tire including a tread portion, said tire being reinforced with carcass plies and a circumferential belt surrounding the outermost carcass ply, said belt comprising superimposed plies generally increasing in width from a relatively narrow inner ply to a widest outer ply, the latter ply having a width less than that of the tread portion, each belt ply comprising a parallelized plurality of high modulus synthetic cords embedded in elastomeric skim stock and lying substantially parallel to the equatorial plane of the tire, each carcass ply comprising a parallelized plurality of synthetic cords lying substantially in radial planes of the tire.

References Cited by the Examiner

UNITED STATES PATENTS

| | | |
|---|---|---|
| 2,498,859 | 2/50 | Lessig. |
| 2,811,998 | 11/57 | Bourdon _____ 152—361 |
| 2,926,065 | 2/60 | Coplan et al. |
| 3,081,811 | 3/63 | Beckadolph et al. ____ 152—361 X |
| 3,090,417 | 5/63 | Spelman _____ 152—361 X |

OTHER REFERENCES

Dacron Technical Manual, Sec. 2: Physical Chemical Properties, pp. 2–7.01 relied upon. Published June 12, 1953, by Du Pont.

ARTHUR L. LA POINT, *Primary Examiner.*